United States Patent
Harwath

(10) Patent No.: US 10,348,073 B2
(45) Date of Patent: Jul. 9, 2019

(54) POWER DISTRIBUTION SYSTEM FOR REMOTE RADIOHEAD INSTALLATIONS

(71) Applicant: CommScope Technologies LLC, Hickory, NC (US)

(72) Inventor: Frank A. Harwath, Naperville, IL (US)

(73) Assignee: CommScope Technologies LLC, Hickory, NC (US)

( * ) Notice: Subject to any disclaimer, the term of this patent is extended or adjusted under 35 U.S.C. 154(b) by 15 days.

(21) Appl. No.: 15/704,316

(22) Filed: Sep. 14, 2017

(65) Prior Publication Data

US 2018/0076603 A1 Mar. 15, 2018

Related U.S. Application Data

(60) Provisional application No. 62/394,811, filed on Sep. 15, 2016.

(51) Int. Cl.
*H02G 3/04* (2006.01)
*H01B 1/02* (2006.01)
(Continued)

(52) U.S. Cl.
CPC .......... *H02G 3/0437* (2013.01); *H01B 1/023* (2013.01); *H01B 1/026* (2013.01); *H01B 7/361* (2013.01);
(Continued)

(58) Field of Classification Search
USPC ........................................ 439/709; 174/72 C
See application file for complete search history.

(56) References Cited

U.S. PATENT DOCUMENTS

| | | | | |
|---|---|---|---|---|
| 4,021,155 A | * | 5/1977 | Erikson | F04B 53/06 417/302 |
| 5,202,538 A | * | 4/1993 | Skirpan | H02B 1/305 174/661 |

(Continued)

OTHER PUBLICATIONS

Notification of Transmittal of the International Search Report and the Written Opinion of the International Searching Authority, or the Declaration, for corresponding International Application No. PCT/US2017/051498, dated Dec. 20, 2017.

*Primary Examiner* — William H. Mayo, III
*Assistant Examiner* — Krystal Robinson
(74) *Attorney, Agent, or Firm* — Myers Bigel, P.A.

(57) ABSTRACT

Aspects of the present disclosure relate to providing cable assemblies for cellular base stations having remote radio head units located atop a radio tower. Each installation requires near-custom cabling, as the electrical resistance of the conductors of the cable assembly varies based on the length of the cable assembly, and because different operators and local governments require different color-coding of the conductors which are coupled to the power trunk. Accordingly, a power distribution system is provided herein wherein conductors of a trunk cable may be coupled to power jumper conductors at transitions. The transitions are generally cylindrical and comprise channels into which splicing lugs are seated. The conductors may be electrically coupled together and secured via set screws. Manufacturing costs may be reduced, as common configurations of trunk cables may be manufactured in higher quantity and coupled to power jumper conductors according to local requirements.

19 Claims, 10 Drawing Sheets

(51) Int. Cl.
*H01B 7/36* (2006.01)
*H01R 4/36* (2006.01)
*H02G 1/00* (2006.01)
*H02G 1/14* (2006.01)

(52) U.S. Cl.
CPC .............. *H01R 4/36* (2013.01); *H02G 1/005* (2013.01); *H02G 1/145* (2013.01)

(56) References Cited

U.S. PATENT DOCUMENTS

| | | | | |
|---|---|---|---|---|
| 6,114,632 A * | 9/2000 | Planas, Sr. | ............ | H01B 9/003 174/117 R |
| 6,771,861 B2 * | 8/2004 | Wagner | ............... | G02B 6/4472 385/100 |
| 6,998,538 B1 * | 2/2006 | Fetterolf, Sr. | ......... | H01B 9/003 174/113 R |
| 8,366,492 B2 * | 2/2013 | Erickson | ................. | H01R 9/24 200/237 |
| 9,575,277 B2 * | 2/2017 | Bakatsias | ............. | G02B 6/4471 |
| 9,640,986 B2 * | 5/2017 | Politis | ................. | H02G 15/113 |
| 2002/0037054 A1 * | 3/2002 | Schurig | ................. | H04B 3/542 375/257 |
| 2008/0159256 A1 * | 7/2008 | Faska | ..................... | H04L 49/351 370/349 |
| 2008/0175553 A1 * | 7/2008 | Hendrickson | ........ | G02B 6/4471 385/135 |
| 2009/0034912 A1 * | 2/2009 | Sepe, Jr. | .............. | G02B 6/3825 385/59 |
| 2012/0106912 A1 * | 5/2012 | McGranahan | ....... | G02B 6/4453 385/135 |
| 2014/0166328 A1 | 6/2014 | Wiekhorst et al. | | |
| 2015/0155669 A1 * | 6/2015 | Chamberlain | ........ | H04W 88/08 455/561 |
| 2015/0346451 A1 * | 12/2015 | Islam | ................. | H02G 15/1055 174/50.52 |

\* cited by examiner

US 10,348,073 B2

POWER DISTRIBUTION SYSTEM FOR REMOTE RADIOHEAD INSTALLATIONS

CROSS-REFERENCE TO RELATED APPLICATION

The present application claims priority under 35 U.S.C. § 119 from U.S. Provisional Application Ser. No. 62/394,811, entitled "POWER DISTRIBUTION SYSTEM FOR REMOTE RADIOHEAD INSTALLATIONS," filed on Sep. 15, 2016, the entire disclosure of which is hereby incorporated by reference herein for all purposes as if set forth in its entirety.

FIELD

The present disclosure relates generally to providing power to radio equipment, and more specifically to remote radio heads installed near a top of a radio tower.

BACKGROUND

A developing trend in the field of wireless and radio communications is a move toward the remote radiohead (RRH) installations. In RRH installations, radio frequency (RF) transceivers are located atop radio towers and are therefore more proximate to the antennas. This reduces a cabling requirement for the transmission and reception of RF signals between the antenna and the radio head, but increases a demand for electrical power at the top of the radio tower.

For example, FIG. 1 is a schematic diagram illustrating a cellular base station 100 that includes a baseband unit (BBU) 110, a tower 120, a plurality of antennas 130 mounted thereon, and a remote radiohead unit (RRU) 140 mounted proximate to each antenna 130. A trunk cable 150 may extend from the BBU 110 to the top of the tower 120. Although not illustrated, further cables such as, for example, power and optical jumper cables may extend to the trunk cable 150 from within the BBU 110. In other words, the trunk cable 150 may be a hybrid cable. Additionally or alternatively, power and optical jumper cables may extend from the trunk cable 150 to the RRUs 140 at the top of the tower 120.

FIG. 2 illustrates in more detail a typical power distribution system 200 for (3) RRUs, which may be the RRUs 140 from FIG. 1. As illustrated, electrical equipment may be installed within the BBU 110, which may comprise an electrical cabinet having one or more circuit breakers and a power supply, here illustrated as a −48 VDC power supply. Electrically coupled with the circuit breakers are three power supply conductors 201, 202, and 203. Also provided are three ground conductors, which are illustrated as conductors having a [G] at the BBU end. These six conductors are provided via the power trunk 150 toward the RRUs 140, which are located remote from the BBU, such as near the top of tower 120. A pair of conductors (that is, a supply conductor and a return/ground conductor) carried via the power trunk 150 may be connected to a power jumper cable 160, 162, or 164. This may occur via splicing using splices 208 at a transition point 206. In other words, the six conductors of the trunk may be split into three pairs, each serving an RRU.

An installer in the field may use a screwdriver to secure the stripped conductor ends to the terminal blocks or connectors in the BBU and at the RRUs. The terminal blocks may have identifying numbers or letters and the trunk and power cables are color-coded for the specific application. These color codes may be defined by governmental agencies or by the system operator, as it may allow inspectors and technicians to quickly assess whether installations conform to specifications or local building codes. For example, power supply conductor 201 marked as [1] at the BBU end may be a cable having a red jacket, power supply conductor 202 marked as [2] at the BBU end may be a cable having a blue jacket, and power supply conductor 203 marked as [3] at the BBU end may be a cable having a brown jacket. Of course, these colors are merely examples presented herein for ease in understanding the present application and the greyscale figures. Power jumper cables 160, 162, and 164 may have commonly color-coded conductors. For example, each of the supply conductors marked as [1], [2], and [3] at the RRU end may each be a cable having a red jacket, and each of the return conductors marked as [G] at the RRU end may each be a cable having a black jacket.

The assembly consisting of the cable trunk, power jumper cables at each end, and the transitions between the trunk and cables, is typically factory-assembled. Therefore, the only modification that can be performed in the field is cutting back the trunk cable and/or power cable lengths to make them fit better in the respective cabinets or cable mounts. From an installation perspective, the current product design works well and does not present significant problems. It is desirable that no major changes be made to the installation methodologies that are currently in practice.

SUMMARY

One general aspect includes a cable assembly. The cable assembly may include a first transition including a first body; a second transition including a second body; a power trunk including a plurality of trunk conductors; a first power jumper cable including a first plurality of power jumper conductors; and a second power jumper cable including a second plurality of power jumper conductors. Each power jumper conductor of the first plurality of power jumper conductors may be electrically coupled to a respective one of the plurality of trunk conductors at the first transition, and each power jumper conductor of the second plurality of power jumper conductors may be electrically coupled to a respective one of the plurality of trunk conductors at the second transition.

In some embodiments, the first body may include a plurality of channels, and ones of the plurality of trunk conductors may be seated in respective ones of the plurality of channels. In some embodiments, the first transition may include a plurality of splicing lugs, and ones of the plurality of splicing lugs may be seated in respective ones of the plurality of channels. In some embodiments, each one of the first plurality of power jumper conductors may be electrically coupled to the respective one of the plurality of trunk conductor via a respective splicing lug of the plurality of splicing lugs. In some embodiments, each trunk conductor of the plurality of trunk conductors may include a color-coded jacket, and each color-coded jacket may include a color in common with each other color-coded jacket. In some embodiments, the first body and the second body each include a plurality of channels, and a first trunk conductor of the plurality of trunk conductors is seated in a channel of the first body and in a channel of the second body. In some embodiments, the first trunk conductor is electrically coupled to a first one of the first plurality of power jumper conductors and a first one of the second plurality of power jumper conductors. In some embodiments, the first trunk conductor is electrically coupled to the first one of the first plurality of power jumper conductors via a first splicing lug at the first transition, and where the first trunk conductor is electrically coupled to the first one of the second plurality of power jumper conductors via a second splicing lug at the second transition. In some embodiments, a first trunk conductor of the plurality of trunk conductors includes an aluminum conductor. In some embodiments, a first power jumper conductor of the first plurality of power jumper conductors is electrically coupled to the first trunk conductor, and where the first power jumper conductor includes a copper conductor. In some embodiments, a first power jumper conductor of the first plurality of power jumper conductors is coupled to a radio frequency (RF) transceiver. In some embodiments, a first trunk conductor of the plurality of trunk conductors includes an conductor having a first wire gauge, a first power jumper conductor of the first plurality of power jumper conductors is electrically coupled to the first trunk conductor, and the first power jumper conductor includes a second wire gauge different from the first wire gauge.

Another general aspect includes a cable assembly transition. The cable assembly transition includes a body including a plurality of channels, each channel including a first portion having a substantially flat bottom surface and a second portion having a curved bottom surface; and a plurality of splicing lugs, where each splicing lug is seated in the first portion of a respective channel of the plurality of channels.

In some embodiments, the body is generally cylindrical, and the splicing lugs of the plurality of splicing lugs are evenly arranged radially about a central axis of the body. In some embodiments, the body includes a distal end and a proximal end, and a first channel is arranged such that the first portion of the first channel is located near the distal end of the body, and a second channel is arranged such that the first portion of the second channel is located near the proximal end of the body. In some embodiments, the cable assembly transition further includes a shoulder interposed between a pair of channels of the plurality of channels. In some embodiments, the body includes a thermoplastic or thermoset material.

Another general aspect includes a method of forming a cable assembly transition. The method may include operations such as forming a body of the cable assembly transition including a plurality of channels, where each channel includes a first portion having a substantially flat bottom surface and a second portion having a curved bottom surface; and seating in the first portion of each channel of the plurality of channels a splicing lug of a plurality of splicing lugs.

In some embodiments, forming the body includes forming the body via injection molding. In some embodiments, the body includes a unitary component.

DETAILED DESCRIPTION

Figure 1:
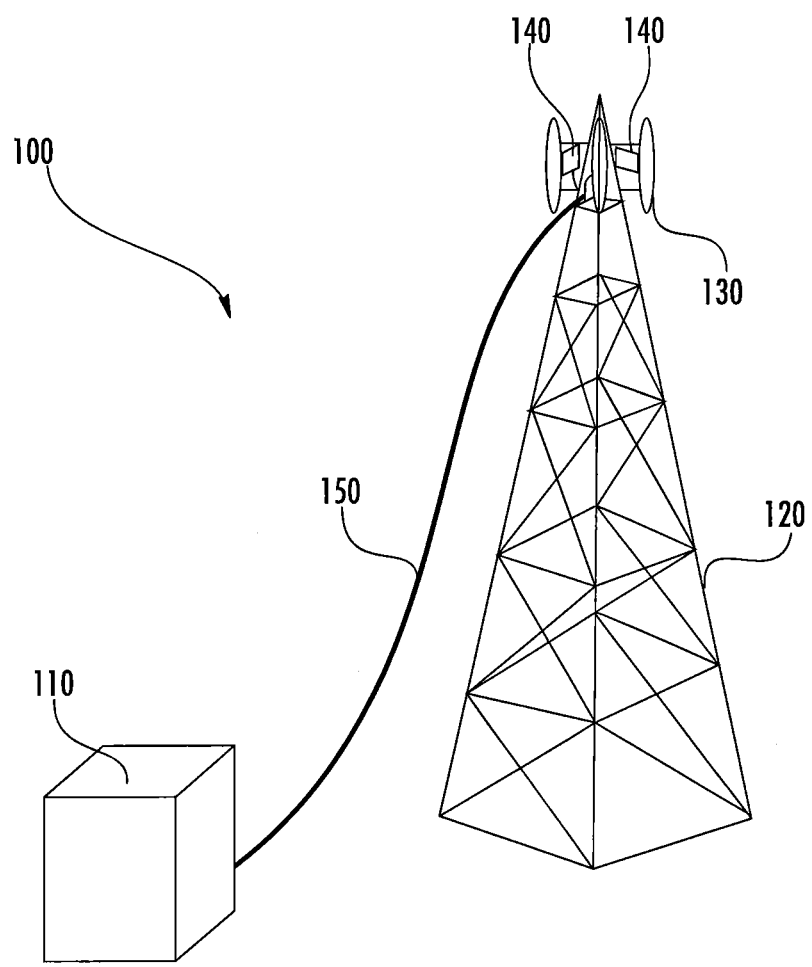
FIG. 1 illustrates an exemplary arrangement of a cellular base station at which aspects of the present disclosure may be used.

Referring back to the background section, although there are advantages from the installation perspective, it has been recognized that there are many disadvantages from the perspective of the manufacturer.

A first problem identified by the inventor is that a size of the power conductor is dictated by the maximum allowable voltage drop between the BBU at the bottom of the tower, and the RRU mounted atop the tower. The voltage drop is based on the maximum current draw at the lowest operational voltage. For example, if the maximum current draw is 25 A at the minimum voltage at the RRU of −43 VDC, the conductor will be sized so that the minimum voltage is exceeded when using a −48 VDC supply. The voltage drop is also based in part on the length of the cable between the BBU and the RRU. For a cable length of 300 feet, the operator might specify 8 AWG (American Wire Gauge) conductors since the resistance is 0.6282 mΩ/ft and the maximum allowed conductor resistance is 0.6667 mΩ/ft. This maximum allowed conductor resistance is calculated based on the difference between the minimum voltage of the supply and the minimum voltage at the RRU, which in this example is 5V, divided by the current draw and the length of the cable (5V)/(25 A×300 ft)=0.667 mΩ/ft. The minimum voltage seen by the RRU would be −43.2885 VDC in this example.

Consider what happens if an attempt to use the next smaller conductor size of 9 AWG is made. The conductor has a resistance of 0.7921 mΩ/ft and the same calculation yields a minimum voltage of −42.0593 VDC, which would be below the operating voltage of the RRU. An undervoltage condition would cause the RRU to shutdown unexpectedly resulting in dropped calls and interrupted service. Therefore, 8 AWG conductors are the smallest, and least expensive, allowable.

Conductor sizes typically used in radio installations may range between 4 AWG to 12 AWG, which may have cross sections between 4 mm$^2$ and 16 mm$^2$. An identified problem is that based on current draw, one conductor size is required for a trunk cable configuration. In other words, the number of conductors may be based on the number of remote radio head units.

As the conductor size requirement changes due to trunk length, additional trunks with different size conductors must be made available. Again, as discussed above, in present practice, these trunks are included in the factory-made assembly, and thus multiple combinations must be manufactured, or the factory must be tooled such that it can manufacture trunk cables to order. For example, a factory may produce trunks with 12 AWG, 10 AWG, 8 AWG, 6 AWG, and even 4 AWG conductors. As production volume is divided across multiple trunk cables, each production run is shorter. This yields lower volumes of cables, increased raw material and finished good supply costs, and increases the amount of production scrap due to start-up losses.

Compounding the problem is that, as discussed above, at the BBU end and at the RRU end, operators and local governments may require color-coded insulation for the conductors. This allows inspectors and technicians to quickly assess whether installations conform to specifications or local building codes. Although this may be beneficial for safety and installation purposes, it has been recognized by the inventor that it is disadvantageous for the manufacturer of the trunk or cable, since there are a very large number of color codes in use. As it is not cost effective for manufacturers and installers to hold inventory of large quantities of cable that may not be usable because the color does not conform to a specification or code, smaller and even to-order production runs may be seen. This in turn may generate delays while the cable with the appropriate color code is produced.

Another problem recognized by the inventor is that different RRUs may require slightly different power cables. Door seals on the RRUs may use gaskets that conform to the outer surface of the power cable. However, as discussed above, an installer does not have the freedom to adjust the cable dimensions to accommodate different conductor diameters because the entire assembly is manufactured at the factory. Yet, because the conductor size varies with cable length, a transition is typically employed between the conductor used for the majority of the cable length (the trunk), and the termination at the RRU where the cable must adhere to the physical dimensions required by the RRU. In general, RRU manufacturers require a single cable consisting of two 12 AWG (or 4 $mm^2$) conductors, with/without a shield, and having an outer jacket 11 mm in diameter. This only increases the number of potential combinations and possible configurations, which, as discussed above, creates further problems for the factory manufacturing the cable assembly that includes the trunk, power conductors, and transitions. For example, five different trunks might be matched with five different power cables, and therefore there may be 25 different possible configurations.

It has been recognized by the inventor that the transitions themselves may be sources of problems. The transition at the RRU end of the power distribution cable must be weatherproof and robust, since it may be directly exposed to the elements at the top of a tower regardless of location worldwide. Failure to produce a robust, weatherized transition may result in short circuits and potential fires causing prolonged service interruption and property damage. Environmental operating temperatures between −40 C to +40 C may be experienced. The transition may be exposed continuously to UV radiation from sunlight, high winds, rain, ice, dust, air pollution, and attack by animals such as rodents or birds. Present solutions to this problem include protecting the transition within sealed enclosures or canisters, or completely encapsulating the transition in potting compound. The difficulty of creating a weatherproof transition increases the cost by the addition of sealed enclosures and waterproof glands used for cable entries, or by use of custom designed weatherproof housings with liquid sealants applied during the assembly process. These approaches may be costly because of material costs, or a combination of material costs and labor.

Finally, it has been recognized by the inventor that, attendant to the transition discussed above, splices may be employed to couple the conductor of the trunk cable with the power conductor cable. Common splicing members include terminal blocks and crimped butt splices, although ultrasonic bonding is another splicing option. Irrespective of the type of splice employed, the conductors of the cable and trunk must be exposed to accomplish the connection, and then insolated and insulated electrically to ensure safe, proper operation. The approaches with lowest labor costs involve large, expensive tools that cannot be used in the field. Crimp splices work with a limited range of conductor sizes and also require different crimp dies for different sizes of conductors. For example, a conductor of the trunk cable may comprise a 8 AWG solid copper strand, which may be spliced at a transition location with a conductor having a 12 AWG solid copper strand. This may create another inventory/production management problem due to the large number of variations of conductor sizes.

Aspects of the present disclosure are therefore directed toward solving one or more of the identified problems currently present in the field.

Figure 2:
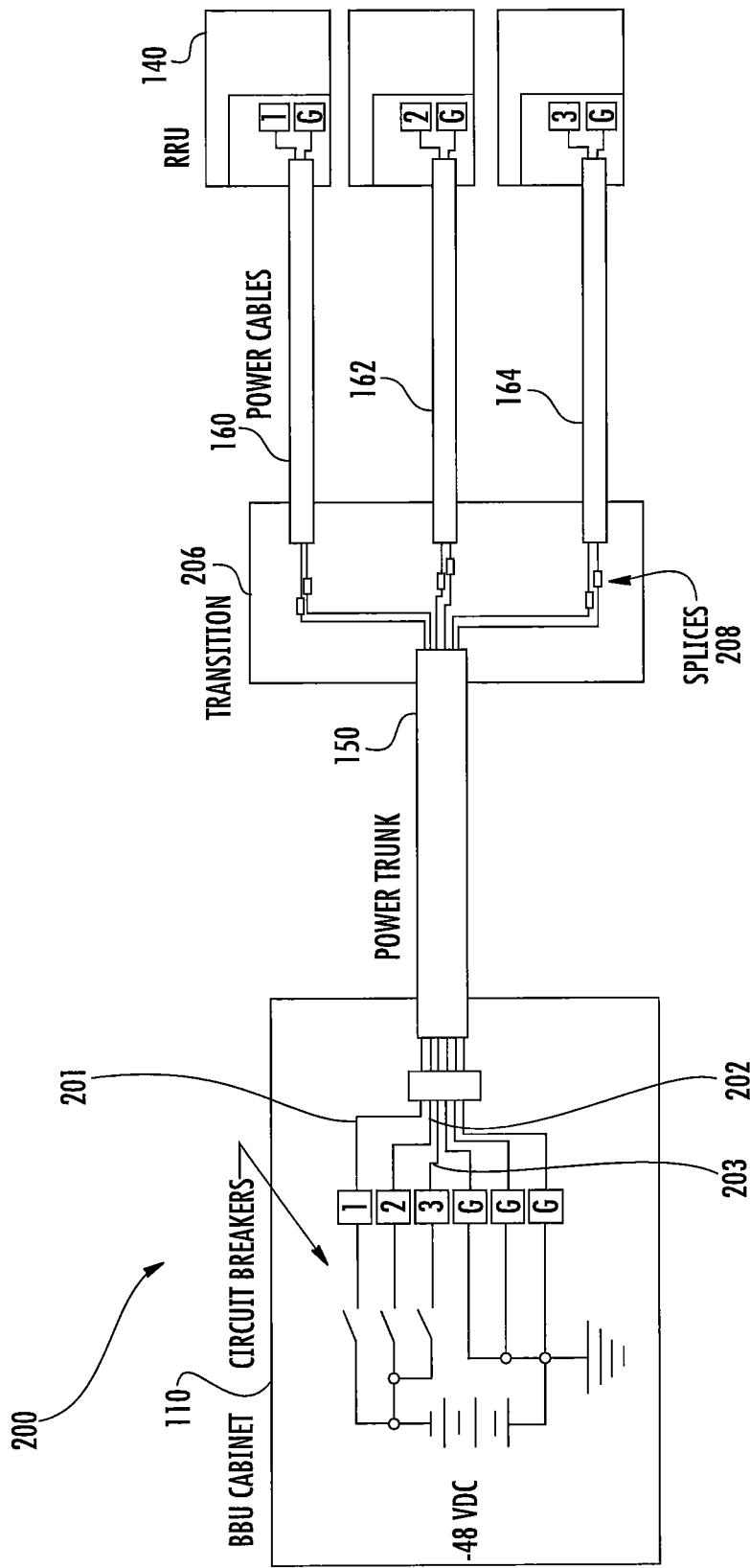
FIG. 2 illustrates an exemplary power distribution arrangement, improvements to which are provided herein.
Figure 3:
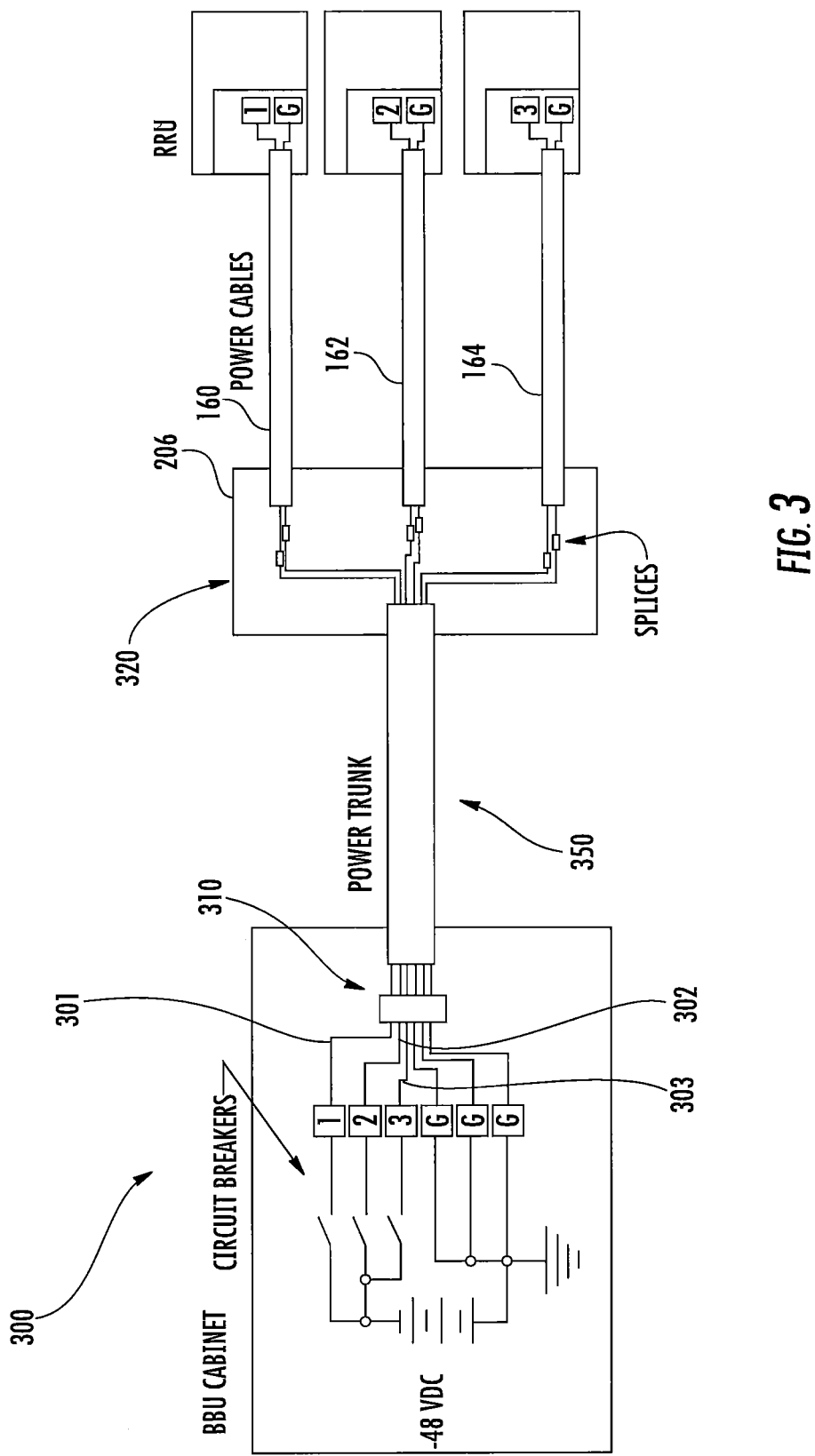
FIG. 3 illustrates a power distribution arrangement according to aspects of the present disclosure.

FIG. 3 illustrates a power distribution system 300 for (3) RRUs, which may be RRUs 140 from FIG. 1, according to aspects of the present disclosure. In contrast to FIG. 2, a first transition 310, a second transition 320, and a power trunk 350 may be provided. The first transition 310 may be referred to herein as a BBU transition or as a transition at the BBU end of the power trunk. The second transition 320 may be referred to herein as a RRU transition or as a transition at the RRU end of the power trunk.

The first transition 310 may enable the coupling of a short section of color-coded conductors at the BBU end of the power trunk cable to be coupled with appropriate corresponding conductors in the trunk. The second transition 320 may enable the coupling of a short section of color-coded conductors at the RRU end of the power trunk cable to be coupled with appropriate corresponding conductors in the trunk. This may enable the usage of any desired color code for the BBU power conductors, in conjunction with any desired color code for the RRU power conductors, and may facilitate easier coupling of the power trunk 350 with the BBU. As will be discussed further with respect to FIGS. 4-7 which follow, the first transition 310 and the second transition 320 may be field terminate-able, and may include splicing lugs for each set of conductor to be spliced, thereby enabling the adjustment of the length of the trunk, as well as coupling conductors in the field.

The first transition 310 may be located within a BBU 110, and as such might not need a separate weatherproof enclosure, as the BBU 110 may already be designed to shield components therein from moisture, heat, and pest damage, as examples. The second transition 320 (e.g., the transition at the RRU end of the power trunk cable) may reside in a weatherproof enclosure (not shown), or be made weatherproof in itself by potting the entire transition area. It is observed that weatherproof enclosures may facilitate an easier upgrading or changing of power conductors after the initial installation, especially where field terminate-able transitions are employed. The use of this type of termination may allow for local customization at installation as well, as different power cable color codes, cable lengths, and mixing power cable wire gauges and power conductor materials may be employed in embodiments practicing aspects of the present disclosure. For example, the power trunk may comprise aluminum power conductors having a first wire gauge, and the power jumper conductors at the BBU side or the RRU side may comprise copper power conductors having a second wire gauge, which may be the same or different from the first wire gauge. Of course, the power conductors of the power trunk may be copper and/or the power conductors of the power jumpers may be aluminum.

The power trunk 350 may have an alternative color-coding or marking scheme to indicate its "trunk-only" status. For example, this marking system may comprise a common color insulation system (e.g., black for supply and red for return) and markings that are printed on the outer surface to distinguish conductors from each other (e.g., a system with incrementing numerals, such as 1, 2, 3, 4; a system with paired supply/return markings, such as 1S, 1R, 2S, 2R; and other possible systems). The marking system may comprise a combination of distinguishing characteristics.

As may be understood with reference to the problems outlined above, the employment of the first transition 310, the second transition 320, and a commonly color-coded power trunk cable 350 reduces the number of potential configurations required for manufacture and assembly, as any color-coding requirements of a customer, operator, or local government are facilitated by the BBU and RRU power conductors. In other words, only one power trunk configuration for each conductor size and number of conductors is required, instead of power trunks having color-coding constraints.

Figure 4:
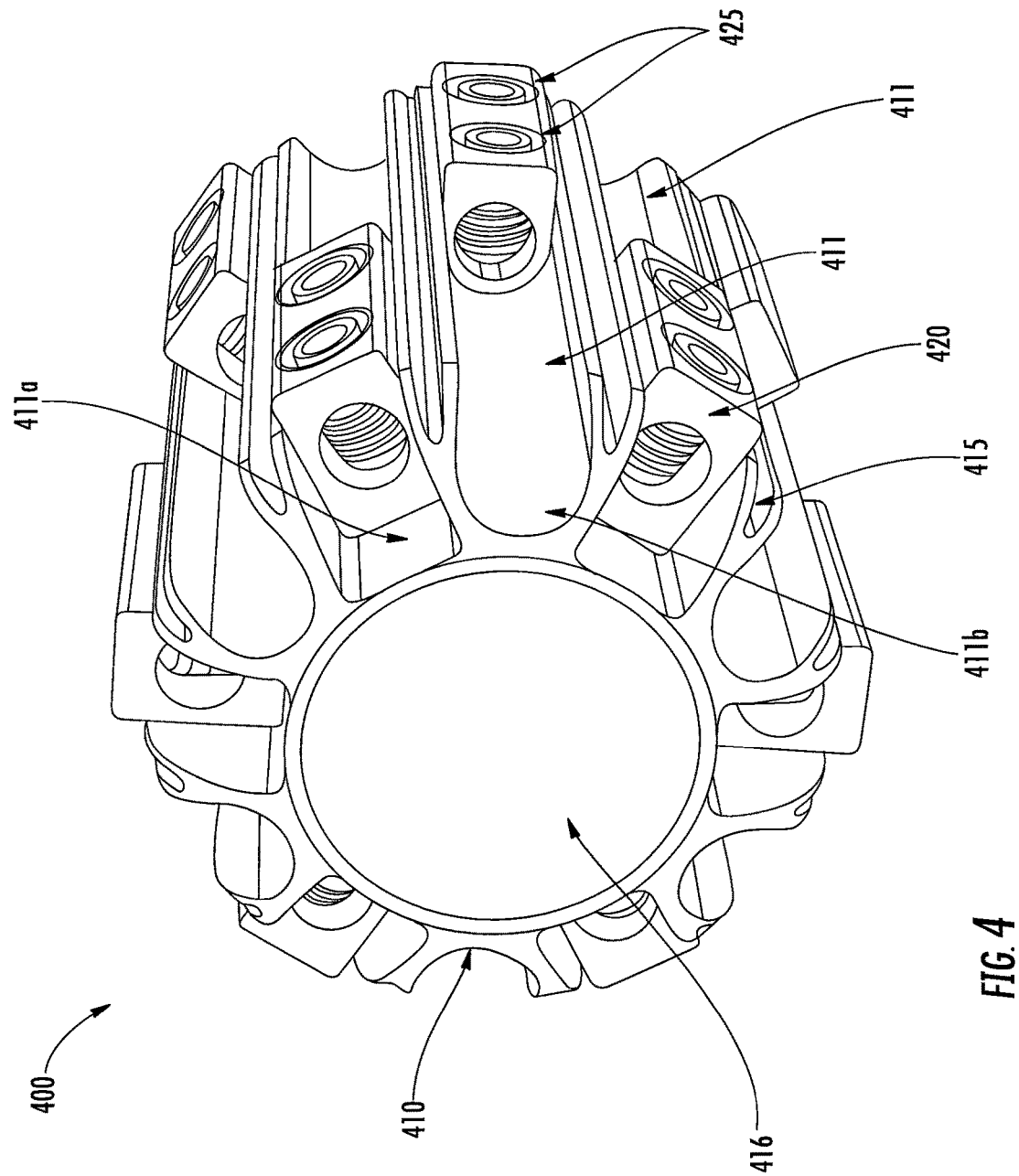
FIGS. 4-7 illustrate various perspective views of a transition, according to aspects of the present disclosure.
Figure 5:
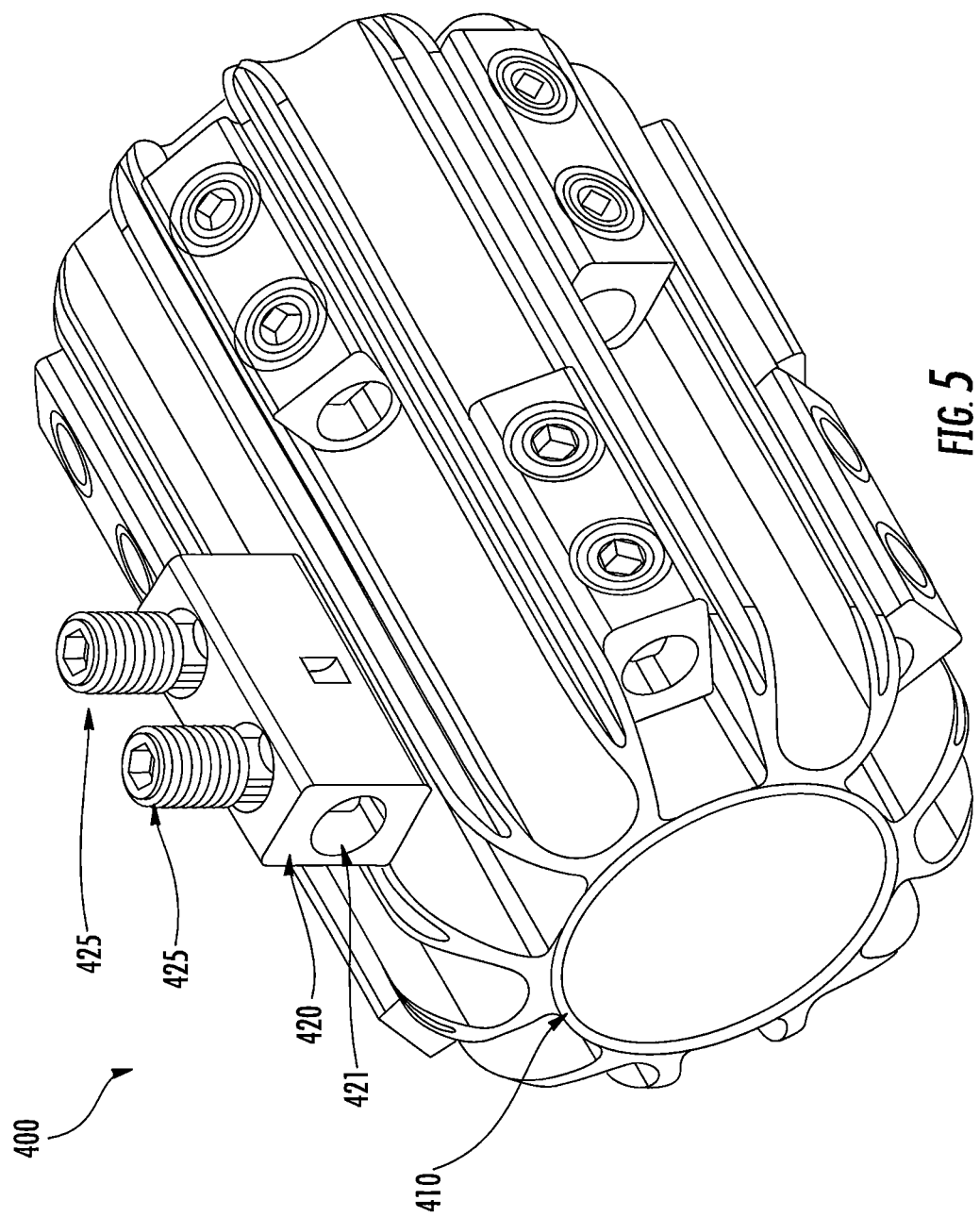
Figure 6:
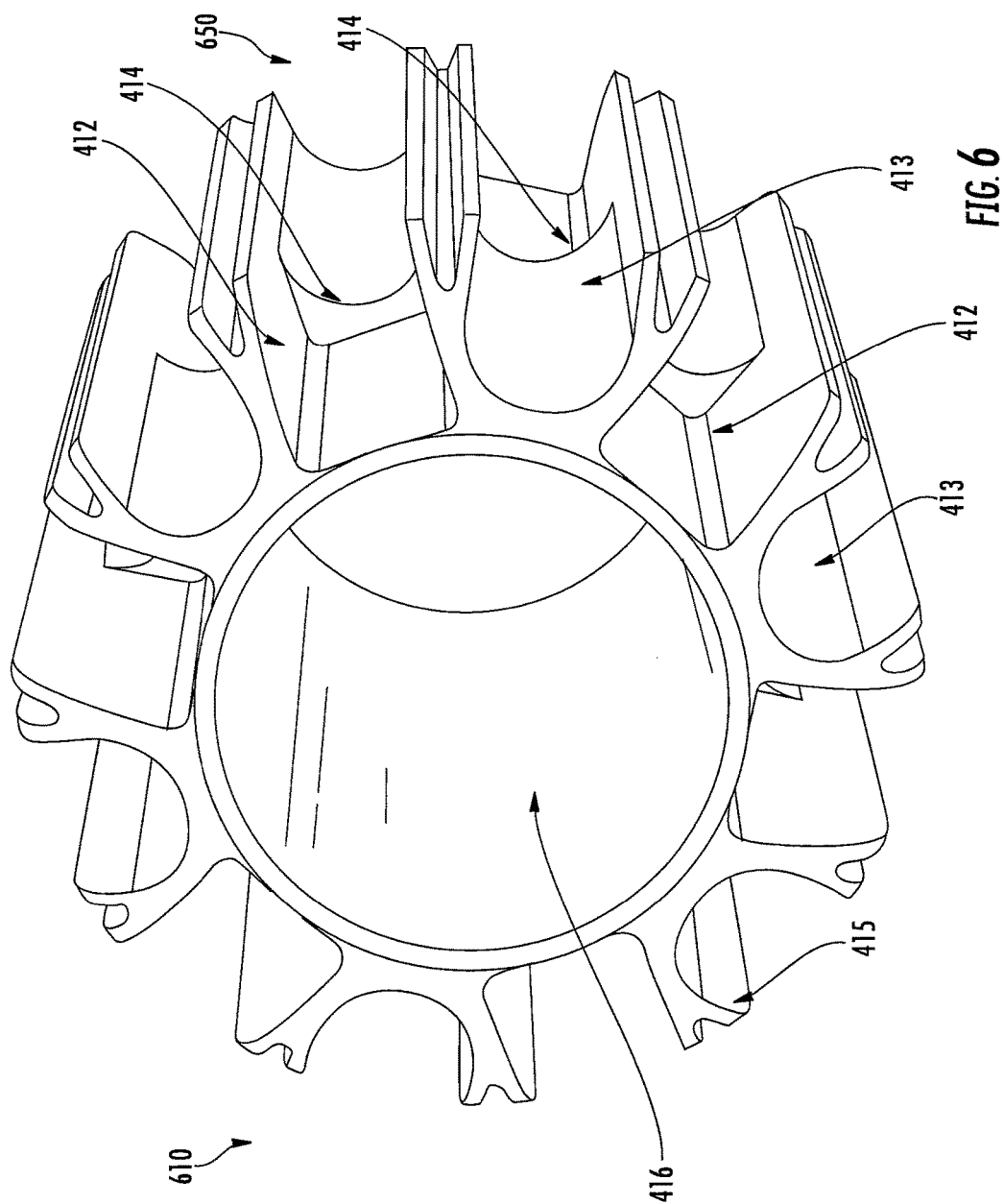
Figure 7:
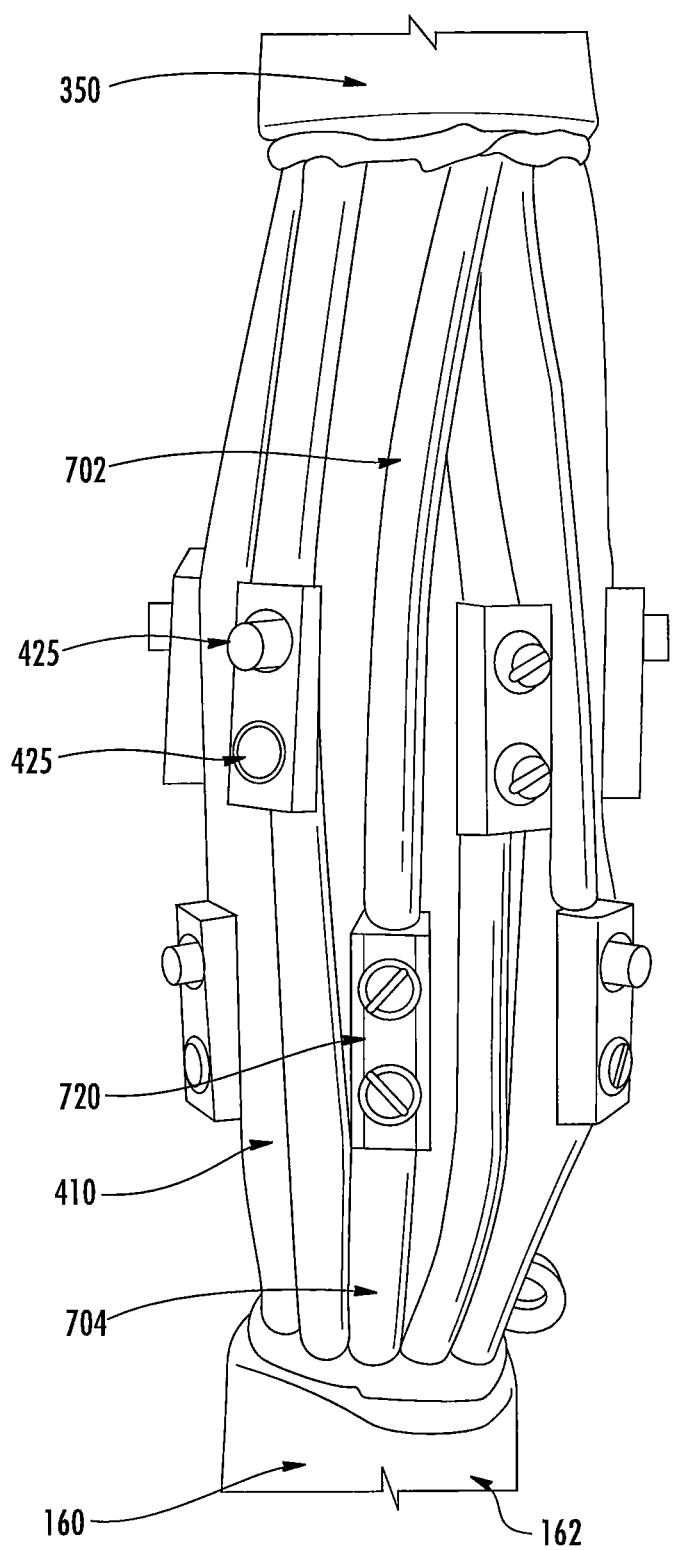

Moreover, to facilitate installation, as discussed above, the first transition 310 and second transition 320 may be field terminate-able. FIGS. 4-7 illustrate various views of a transition 400, according to one or more aspects of the present disclosure. Transition 400 may be employed in some systems as first transition 310 or second transition 320. FIG. 4 illustrates a perspective view of the transition 400. FIG. 5 illustrates an alternative partially exploded view of the transition. FIG. 6 illustrates a perspective view of the transition body 410 with the splicing/reducing lug 420 removed. FIG. 7 illustrates a perspective view of a transition 400 in use to couple conductors of power trunk 350 to conductors of power jumper cables 160 and 162.

Transition 400 may include a body 410, and a plurality of splicing/reducing lugs 420, which may be referred to herein as a splicing lug. In some aspects, the body 410 may be a molded thermoplastic or thermoset body. The material used for molding the body may be selected from any number of acceptable materials, based on the temperature and regulatory requirements of the installation. The body 410 of the transition 400 may be generally cylindrical with the splices evenly arranged radially about the center axis. This may maintain a consistent centerline through the trunk/transition/power cable assembly. There are several identified advantages resulting from this, such as a lower wind cross-section, an ease of installation of potential cable hangers on the radio tower, and allowing the installer to seal the RRU transition by use of a single piece of adhesive-lined heat shrink tubing.

A plurality of channels 411 may be provided, the number of which may vary depending on the number of power jumper conductors which are coupled to the power trunk via the transition 400. The number of power jumper conductors may in turn be dependent on the number of RRUs. For example, the transition 400 illustrated in the figures comprises twelve channels, and may thus provide splice points for conductors for six RRUs. More or fewer channels may be provided, with the general relationship being two channels for each RRU. An opening 416 may be provided as part of the body 410. In some aspects, the opening 416 may be dimensioned such that one or more optical fibers may be fed through the transition.

Each channel 411 comprises a first portion 411a which has a generally and substantially flat bottom surface and substantially flat sidewalls, and a second portion 411b with a generally curved bottom surface. Furthermore, channels 411 alternate between having their first portion 411a located proximate to a first end of the transition body, and having their first portion located proximate to an end of the transition body opposite the first end. This can be best seen in FIG. 6, where a first group of channels a first group of channels 412 have their substantially flat bottom surfaces located proximate to the proximal end 610 of the body 410, and their generally curved bottom surface portions located proximate to a distal end 650 of the body 410. A second group of channels 413 have their curved bottom surface portions located proximate to a proximal end 610 of the body 410, and their substantially flat bottom surface portions located proximate to a distal end 650 of the body 410.

To accommodate the height of the splicing lug 420, a height of a portion having a curved bottom surface, when measured from the outer diameter of the opening 416 may be greater than a height of a portion having a flat bottom surface. For example, the first (flat bottom surface) portion of a channel from the first group of channels 412 located proximate to the proximal end 610 of the body 410 abuts the outer diameter of the opening 416, whereas the second (curved bottom surface) portion of a channel from the second group of channels 413 does not abut the outer diameter; instead, a quantity of thermoplastic or thermoset material is provided therebetween. Each channel may therefore be provided with a lug stop 414, which may face toward the distal end 660 of the body 410 or toward the proximal end 610 of the body 410, depending on the channel. A splicing lug 420 may sit in the first portion of a channel, and may abut the lug stop 414, which may prevent unwanted movement of the splicing lug 420. The second portion of a channel may also provide support for a power conductor seated therein.

Interposed between each pair of channels 411 is a ribbed shoulder 415, which maintains the relative spaces of the channels, and may in some applications provide additional creepage and clearance distances as prescribed by Underwriters Laboratories (UL) for safety.

Turning to FIG. 5, a plurality of splicing lugs 420 may be provided, with the general relationship being one splicing lug per channel. The splicing lugs 420 may be machined from extruded aluminum, and may be plated with tin. This tin-plating may be used to prevent galvanic corrosion when aluminum or copper conductors are used. Ends of the wires to be spliced at the splicing lug 420 are secured by the use of set screws 425 that are tightened with a screwdriver or hex-wrench depending on the type of set screw used. Each conductor inserted into the splicing lug 420 may be secured using a respective one of the set screws 425. Each splicing lug 420 may be secured to the housing using screws, press-fit, frictional engagement, epoxy, bonding, or the like.

The splicing lugs 420 can be used with a wide range of conductor sizes. In some aspects, the splicing lug may be UL listed for use with 4 AWG to 14 AWG conductors. Metric sizes which fall within the same wire cross-sectional areas are also accommodated. Accordingly, a through-hole 421 may have a maximum diameter sized for a 4 AWG conductor may be provided, though in some aspects, splicing lugs 420 may comprise splicing openings that might not pass entirely through the splicing lug. The through-hole 421 may have a circular cross-section, or may have a cross-section similar to a raindrop or teardrop shape (e.g., a portion of the outer diameter may be non-circular and include a rounded arc of different diameter than the cross-section, or include an angle). The cross-section may be non-uniform to accommodate the conductor during the tightening of the set screws 425, which may force the conductor toward the inner surface of the splicing lug 420 opposite the set screw 425.

As illustrated in FIG. 7, power trunk cable 350 may comprise a power conductor 702, which is coupled to power conductor 704 by way of splicing the conductors together at splicing lug 720.

Figure 11:
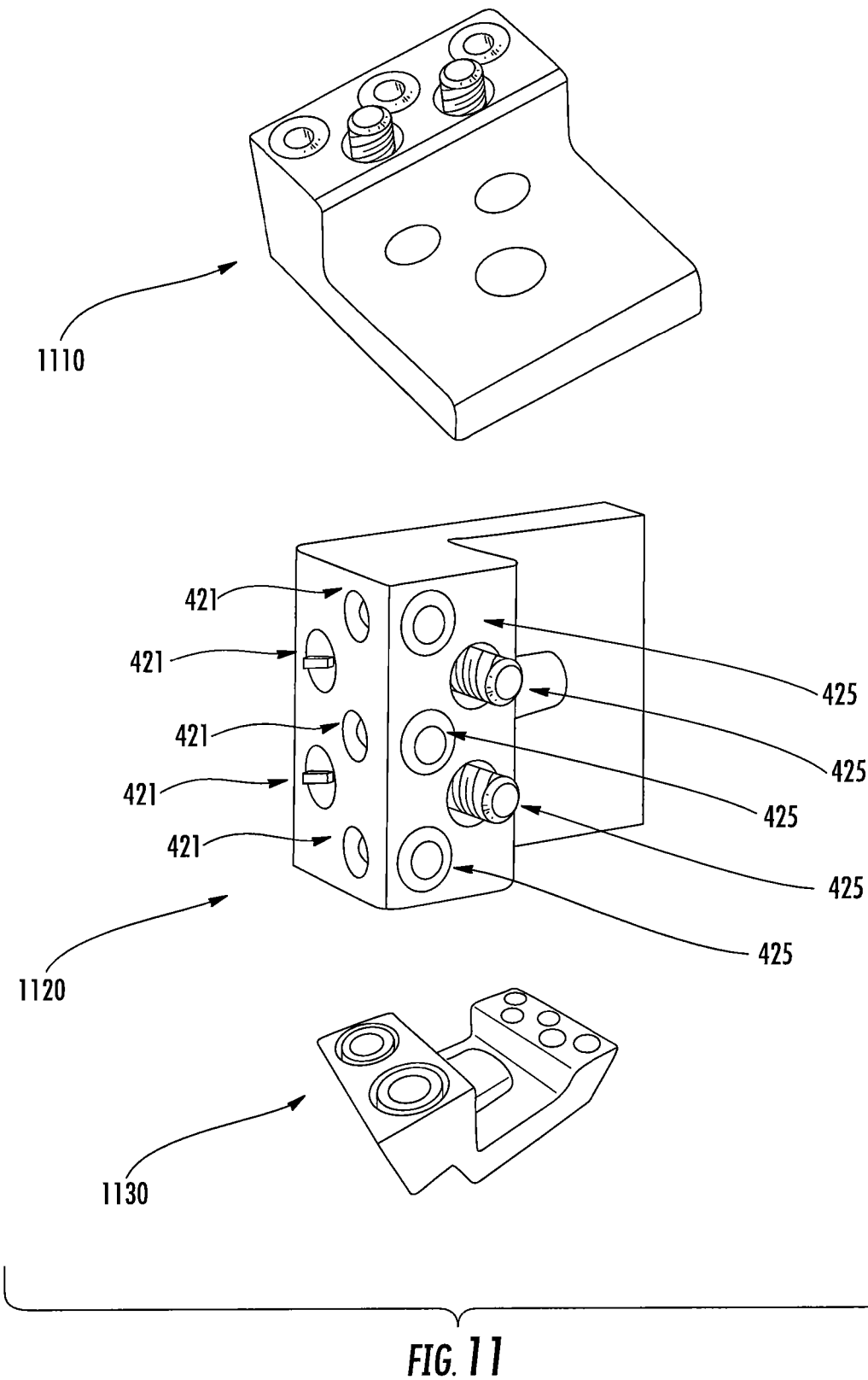
FIG. 11 illustrates various example splicing lugs which may be used in conjunction with one or more aspects of the present disclosure.

Although not illustrated in the figures discussed above, it is to be understood that the splicing lugs 420 are not limited to receiving two conductors. In some aspects, multiple conductors of the power trunk or of the power jumper cables at the RRU side or the BBU side may be tied together via splicing at a splicing lug having more holes than hole 421. For example, as illustrated in FIG. 11, which illustrates alternative arrangements 1110, 1120, and 1130 of splicing lugs used in accordance with one or more aspects of the present disclosure, a splicing lug may accept five conductors via five holes 421, each of which is secured using a respective set screw 425. The dimensions of body 410 may be modified to accept such a splicing lug. It is to be understood that the arrangements illustrated in FIG. 11 are merely exemplary and that usage of other arrangements of splicing lugs is within the scope of the present disclosure.

Figure 8:
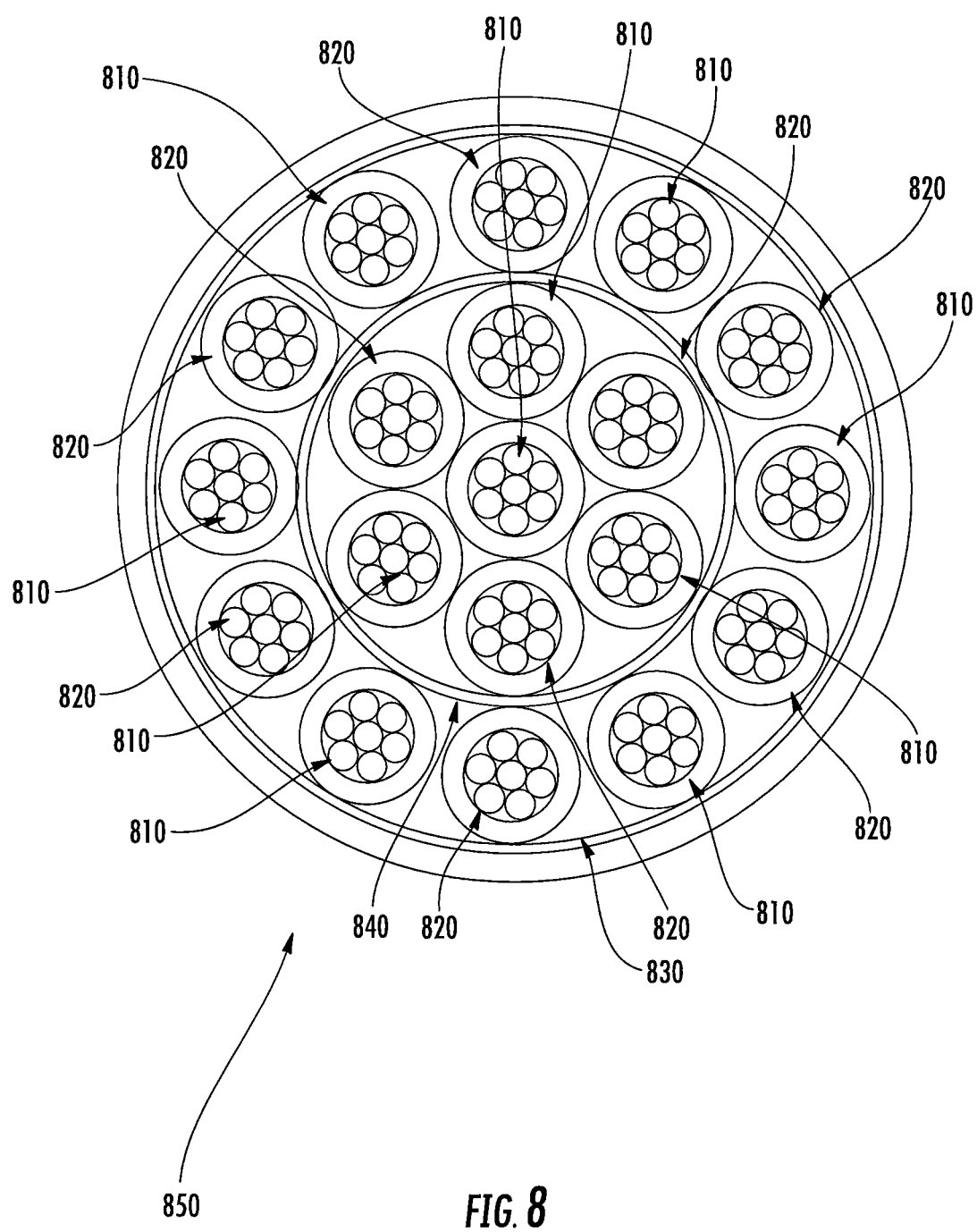
FIGS. 8-10 illustrate end views of various cable arrangements which may be used in conjunction with one or more aspects of the present disclosure.
Figure 9:
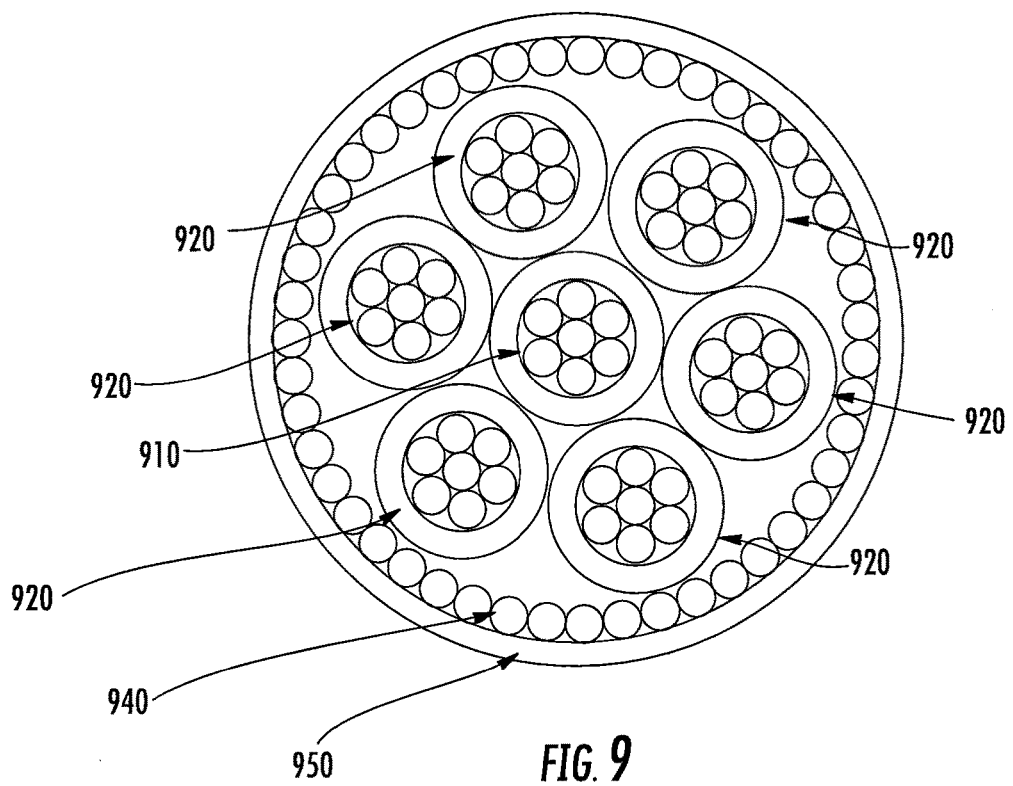
Figure 10:
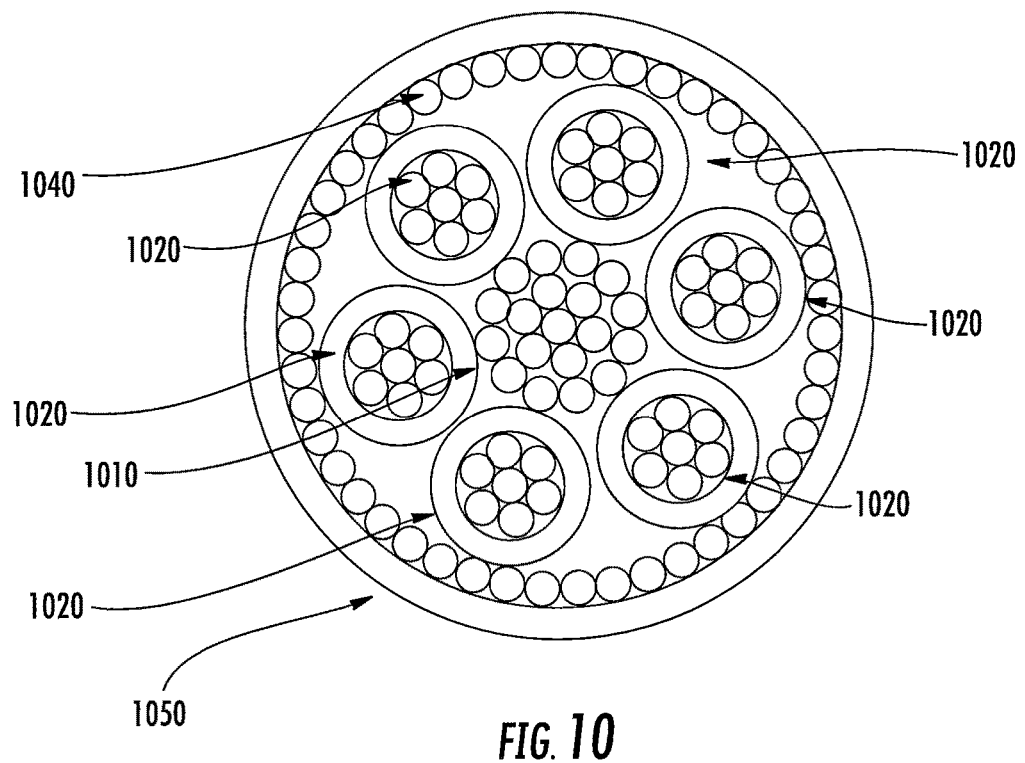

FIGS. 8-10 illustrate end views of novel cable arrangements which may be used as a power conductor trunk in accordance with one or more aspects discussed herein. In particular, the use of multiple splice point splicing lugs may facilitate the tying together of ground conductors or return conductors in common. Not all of these conductors need to be insulated. Briefly, FIG. 8 illustrates a power trunk 850 for a nine RRU installation. Illustrated in FIG. 8 are an outer shield 830, which surrounds the 18 power conductors (nine power supplies 820 and nine power grounds or returns 810), and an inner shield 840 which surrounds only a portion of the power conductors (here, three supplies 820 and four returns 810). FIG. 9 illustrates a six RRU installation power trunk 950 having six insulated power supply conductors 920 surrounding an insulated power return 910 and surrounded by an outer serve return 940. FIG. 10 illustrates a six RRU installation power trunk 1050 having six insulated power supply conductors 1020 surrounding an un-insulated power return 1010 and surrounded by an outer serve return 1040. The arrangements in FIGS. 9-10 may reduce costs because not every return conductor need be insulated. Moreover, the arrangements in FIGS. 8-10 may reduce inductance, because the power supplies are both surrounding and surrounded by the return conductors. Tying the return conductors together may also create beneficial power improvements at the RRUs. As the RRUs near the top of the tower are operating, each may have different power usages; tying the return conductors together may reduce voltage drops, which may reduce operating costs (as there is reduced power loss). Any circuit protection problems may be avoided by usage of the circuit breakers at the BBU end, illustrated in FIG. 3 and briefly discussed above.

Aspects of the present disclosure have been described above with reference to the accompanying drawings, in which embodiments of the present disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A cable assembly comprising:
   a first transition comprising a first body, wherein the first body comprises a first plurality of channels arranged radially about a central axis of the first body, wherein each channel of the first plurality of channels extends in parallel to the central axis of the first body and is partially open in a direction perpendicular to the central axis of the first body;
   a second transition comprising a second body, wherein the second body comprises a second plurality of channels arranged radially about a central axis of the second body, wherein each channel of the second plurality of channels extends in parallel to the central axis of the second body and is partially open in a direction perpendicular to the central axis of the second body;
   a power trunk comprising a plurality of trunk conductors;
   a first power jumper cable comprising a first plurality of power jumper conductors; and
   a second power jumper cable comprising a second plurality of power jumper conductors,
   wherein each power jumper conductor of the first plurality of power jumper conductors is electrically coupled to a respective one of the plurality of trunk conductors at the first transition and is seated in a respective channel of the first plurality of channels, and wherein each power jumper conductor of the second plurality of power jumper conductors is electrically coupled to a respective one of the plurality of trunk conductors at the second transition and is seated in a respective channels of the second plurality of channels.

2. The cable assembly of claim 1, wherein the first transition comprises a plurality of splicing lugs, and wherein ones of the plurality of splicing lugs are seated in respective ones of the first plurality of channels such that a bottom surface of each splicing lug contacts a surface of the respective channel of the first plurality of channels.

3. The cable assembly of claim 2, wherein each power jumper conductor of the first plurality of power jumper conductors is electrically coupled to the respective trunk conductor of the plurality of trunk conductors via a respective splicing lug of the plurality of splicing lugs.

4. The cable assembly of claim 1, wherein each trunk conductor of the plurality of trunk conductors comprises a color-coded jacket, and wherein each color-coded jacket comprises a color in common with each other color-coded jacket.

5. The cable assembly of claim 1, wherein a first trunk conductor of the plurality of trunk conductors is seated in a respective channel of the first plurality of channels and in a respective channel of the second plurality of channels.

6. The cable assembly of claim 5, wherein the first trunk conductor is electrically coupled to a first one of the first plurality of power jumper conductors and a first one of the second plurality of power jumper conductors.

7. The cable assembly of claim 6, wherein the first trunk conductor is electrically coupled to the first one of the first plurality of power jumper conductors via a first splicing lug at the first transition, and wherein the first trunk conductor is electrically coupled to the first one of the second plurality of power jumper conductors via a second splicing lug at the second transition.

8. The cable assembly of claim 1, wherein a first trunk conductor of the plurality of trunk conductors comprises an aluminum conductor.

9. The cable assembly of claim 8, wherein a first power jumper conductor of the first plurality of power jumper conductors is electrically coupled to the first trunk conductor, and wherein the first power jumper conductor comprises a copper conductor.

10. The cable assembly of claim 1, wherein a first power jumper conductor of the first plurality of power jumper conductors is coupled to a radio frequency (RF) transceiver.

11. The cable assembly of claim 1, wherein a first trunk conductor of the plurality of trunk conductors comprises an conductor having a first wire gauge, wherein a first power jumper conductor of the first plurality of power jumper conductors is electrically coupled to the first trunk conductor, and wherein the first power jumper conductor comprises a second wire gauge different from the first wire gauge.

12. A cable assembly transition, comprising:
a body comprising a plurality of channels arranged radially about a central axis of the body, each channel extending in parallel to the central axis of the body and partially open in a direction perpendicular to the central axis of the body, each channel further comprising a first portion having a substantially flat bottom surface and a second portion having a curved bottom surface; and
a plurality of splicing lugs, each splicing lug dimensioned to seat in the first portion of a respective channel of the plurality of channels such that a bottom surface of the splicing lug contacts the bottom surface of the first portion of the respective channel.

13. The cable assembly transition of claim 12, wherein the body is generally cylindrical.

14. The cable assembly transition of claim 12, wherein the body comprises a distal end and a proximal end, and wherein a first channel is arranged such that the first portion of the first channel is located near the distal end of the body, and wherein a second channel is arranged such that the first portion of the second channel is located near the proximal end of the body.

15. The cable assembly transition of claim 12, further comprising a shoulder interposed between a pair of adjacent channels of the plurality of channels.

16. The cable assembly transition of claim 12, wherein the body comprises a thermoplastic or thermoset material.

17. A cable assembly transition, comprising:
a body comprising a plurality of channels arranged radially about a central axis of the body, each channel extending in parallel to the central axis of the body and comprising first and second sidewalls each having an upper surface, each channel further comprising a first portion having a substantially flat bottom surface and a second portion having a curved bottom surface; and
a plurality of splicing lugs, each splicing lug dimensioned to seat in the first portion of a respective channel of the plurality of channels, wherein an upper surface of the splicing lug is further from the central axis of the body than the upper surfaces of the first and second sidewalls of the respective channel of the plurality of channels.

18. The cable assembly transition of claim 17, wherein the body comprises a distal end and a proximal end, and wherein a first channel is arranged such that the first portion of the first channel is located near the distal end of the body, and wherein a second channel is arranged such that the first portion of the second channel is located near the proximal end of the body.

19. The cable assembly transition of claim 18, wherein a sidewall of a first channel of the plurality of channels and a sidewall of a second channel of the plurality of channels that is adjacent to the first channel define a ribbed shoulder between the first channel and the second channel.

\* \* \* \* \*